United States Patent
Doughty et al.

(12)
(10) Patent No.: US 6,299,850 B1
(45) Date of Patent: Oct. 9, 2001

(54) CARBON ACTIVATION PROCESS FOR INCREASED SURFACE ACCESSIBILITY IN ELECTROCHEMICAL CAPACITORS

(75) Inventors: Daniel H. Doughty, Albuquerque, NM (US); Erhard T. Eisenmann, Belpre, OH (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/270,670

(22) Filed: Mar. 16, 1999

(51) Int. Cl.$^7$ ................. H01M 4/04; D01F 9/14
(52) U.S. Cl. ........... 423/445 R; 361/502; 423/447.1; 423/447.8; 429/231.8
(58) Field of Search ............. 423/445 R, 447.1, 423/447.7, 447.8; 361/502; 429/231.8

(56) References Cited

U.S. PATENT DOCUMENTS 5,891,922 * 4/1999 Oyama et al. ............... 423/445 R
5,993,969 * 11/1999 Tan .............................. 427/228
6,060,424 * 5/2000 Alford ........................ 423/445 R

* cited by examiner

Primary Examiner—Stuart L. Hendrickson
(74) Attorney, Agent, or Firm—James C. Durkis; Armand McMillan; Virginia B. Caress

(57) ABSTRACT

A process for making carbon film or powder suitable for double capacitor electrodes having a capacitance of up to about 300 F/cm$^3$ is disclosed. This is accomplished by treating in aqueous nitric acid for a period of about 5 to 15 minutes thin carbon films obtained by carbonizing carbon-containing polymeric material having a high degree of molecular directionality, such as polyimide film, then heating the treated carbon film in a non-oxidizing atmosphere at a non-graphitizing temperature of at least 350° C. for about 20 minutes, and repeating alternately the nitric acid step and the heating step from 7 to 10 times. Capacitors made with this carbon may find uses ranging from electronic devices to electric vehicle applications.

8 Claims, 3 Drawing Sheets

CARBON ACTIVATION PROCESS FOR INCREASED SURFACE ACCESSIBILITY IN ELECTROCHEMICAL CAPACITORS

The United States Government has rights in this invention pursuant to Contract No. DE-AC04-94AL85000 between the U.S. Department of Energy (DOE) and Sandia Corporation.

FIELD OF THE INVENTION

The invention relates to the preparation of a type of electrolytic double layer capacitor that can store very high levels of electrical energy in the smallest possible volume and can deliver very high power. More particularly, the invention relates to the processing of the carbon electrodes used in double layer capacitors.

DESCRIPTION OF THE PRIOR ART

Double layer capacitors, also known as "supercapacitors" or "ultracapacitors", have been in commercial use in the electronics and computer industries and are now under development as hybrid motive power sources for electric vehicles (Proceedings of the "Third International Seminar on Double Layer Capacitors and Similar Energy Storage Devices", Dec. 6–8, 1993, Deerfield Beach, Fla.).

Conventionally, many double layer capacitors employ activated carbon as electrode material, because of its large internal surface area. This same property makes activated carbon effective in the adsorption and removal of impurities from drinking and waste water, as well as from many other liquids and gases used in industrial processes. When destined to adsorption purposes, carbon is usually prepared by heating a carbonaceous material such as coal, coconut shell, wood, cellulose, or certain man-made polymeric materials, to drive off non-carbon components, e.g., water, oxygen, hydrogen, and nitrogen. Further treatment of the product with air, steam, or carbon dioxide at 70 to 950° C. expands and extends the pore network, but also burns a considerable portion of carbon, which causes the carbon to assume very low density and to become very fragile. These processes are documented worldwide in the scientific and patent literature and have been reviewed in many articles and books (See, for example, "Carbon Adsorption Handbook", P. N. Cheremisinoff and F. Ellerbusch, Ann Arbor Science Publishers, Inc., 1978).

For carbon used in double layer capacitor, the objective has been to maximize the porosity in order to obtain very high capacitance and energy density, while preserving structural stability. Besides the traditional activation process used to achieve the desired properties, other methods have been tried for making better double layer capacitors through the use of carbon foams. Thus, J. L. Kashmitter et al. claim that a capacitance of one to ten farads per cubic centimeter of monolithic carbon foam is possible (U.S. Pat. No. 5,260,855, issued on Nov. 9, 1993).

In conventionally activated carbons, most of the internal surface exists in micropores, which are effective in adsorbing many chemical species but are too small for electrical double layer formation. Longer, more intensive conventional activation can generate more pore area but does not significantly change the pore size distribution. As a result, excessive activation will not improve but rather will cause the quality of the carbon electrodes to deteriorate, due particularly to a very substantial weakening of the carbon structure.

It is an object of the present invention, therefore, to develop a process for increasing the available surface of carbon electrodes for double layer capacitors. It is also an object to make possible the manufacture of double capacitors having very high capacitance and very high energy storage capabilities for use in electronic devices and in hybrid motive power sources for electric vehicles. Another object is to provide high electrical energy storage in the smallest possible volume. A further object is to provide a process that preserves the mechanical strength of carbon electrodes. A further object is to make possible the assembly of very large double layer capacitors for use in electric vehicles. A still further object is to create a process that is easy to use and can achieve uniform product quality. Additional objects, advantages, and novel features of the invention will become apparent to those skilled in the art upon examination of the following description or may be learned in the practice of the invention.

SUMMARY OF THE INVENTION

In order to accomplish the objects of the invention, there has been developed a new process which employs the same operating principles as conventional activations, namely oxidation and gasification of carbonized material.

According to the new process, carbon films obtained by carbonization of a polymeric material having a high degree of molecular directionality, e.g., polyimide films, are oxidized in one to five molar aqueous nitric acid at 25° C. for 5 to 15 minutes and are then pyrolyzed at a temperature of at least 350° C. for a period of at least 15 minutes. These treatments are repeated in that sequence 7 to 10 times or until the desired capacitance is obtained. A capacitance of about 300 farads per cubic centimeter can be achieved and densities within the range of 0.6 to 1.2 $g/cm^3$ can be obtained.

DETAILED DESCRIPTION OF THE INVENTION

In accordance with the present invention, the electrochemical surface accessibility of carbon electrodes for double layer capacitors is substantially increased with a new activation process. Although, as was mentioned earlier, the process employs the same operating principles as conventional activations, namely oxidation and gasification of the carbonized material, these techniques have now been significantly modified to yield unexpected results. Thus, instead of using continuous burn-off at high temperatures, the new approach calls for low-temperature, self-limiting oxidation, followed by gasification of the carbon-oxygen compounds in an inert atmosphere at high temperatures. Cycling between low-temperature oxidation and high-temperature gasification enables the oxidant to penetrate into the depth of the micropores without being prematurely consumed. Since each treatment cycle involves only a small quantity of carbon, the micropores have a much improved chance to participate in the oxidation reaction compared to conventional activation processes. As a result, micropores grow proportionately more in size than macropores and the previously inaccessible surface becomes useful for double layer formation. It was hypothesized that the electrochemical surface accessibility might increase in geometric progression with the number of treatment cycles. This has been found to be the case for thin polyimide-derived carbon films. However, thick films and all low-density monolithic carbon studied did not give the dramatic effect seen with thin films. The reason for this difference is that thin polyimide films have a high degree of molecular directionality, while other materials do not. Therefore, the selection of a precursor material for the carbon preparation must involve proper consideration of the polymeric characteristics of the starting material.

Figure 1:
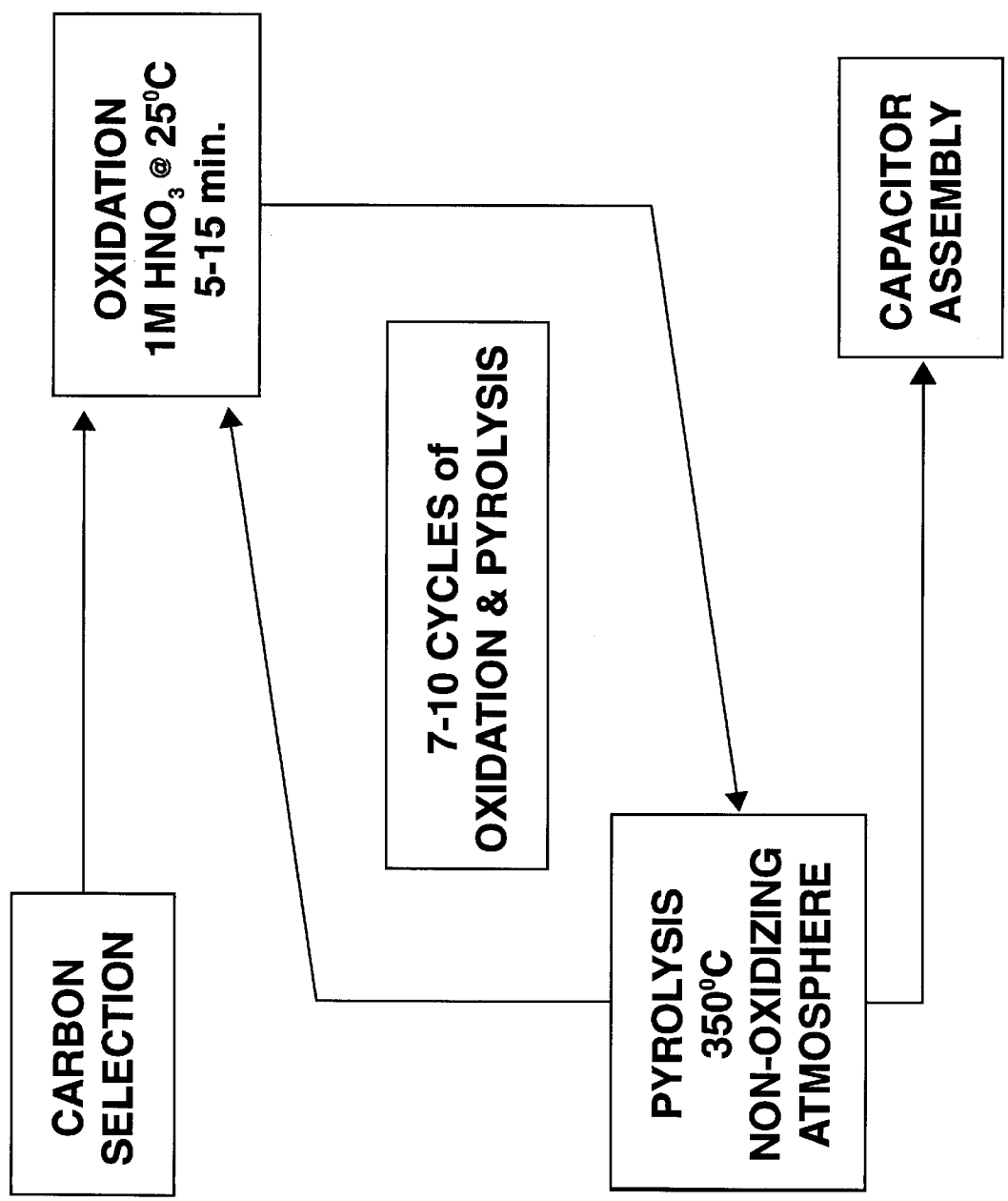
FIG. 1 is a diagrammatic illustration of the new process for activating carbon for use as electrodes in double layer capacitors.

The inventive process can be quickly visualized by reference to the diagrammatic description shown in FIG. 1.

In order to carry out this process, there is first selected a carbon-containing material which can be converted into carbon electrodes for double layer capacitors. The material can be fashioned into thin plates, sheets, or films of desired shape (e.g., circular, square, or rectangular surface). Such specimens can have up to hundreds of square centimeters in geometrical area and yet must be sufficiently elastic to survive slight bending. Usable starting materials are selected on the basis of in-plane orientation, porosity, mechanical strength, and thickness. The best results have been obtained with thin polyimide films because, as mentioned earlier, they have a high directionality.

After the carbon-containing material has been conventionally carbonized, it is then oxidized and pyrolyzed in the following manner. The preferred oxidizing agent for the activation process is nitric acid, 1 to 5 molar. Lower concentrations decrease the reaction rate, while much higher concentrations cause premature breakdown of the carbon structure. The oxidation reaction is preferably carried out at 20 to 25° C. for about 5 minutes. Higher temperatures neither aid nor hinder the process.

Shorter times may lead to non-uniformities in large specimens, but longer times provide no tangible advantages.

The pyrolysis of the oxidized carbon film is best carried out at about 350° C. for a period of about 15 minutes. Higher temperatures have no degrading effects, while longer times have no significant influence on the quality of the carbon.

Figure 2:
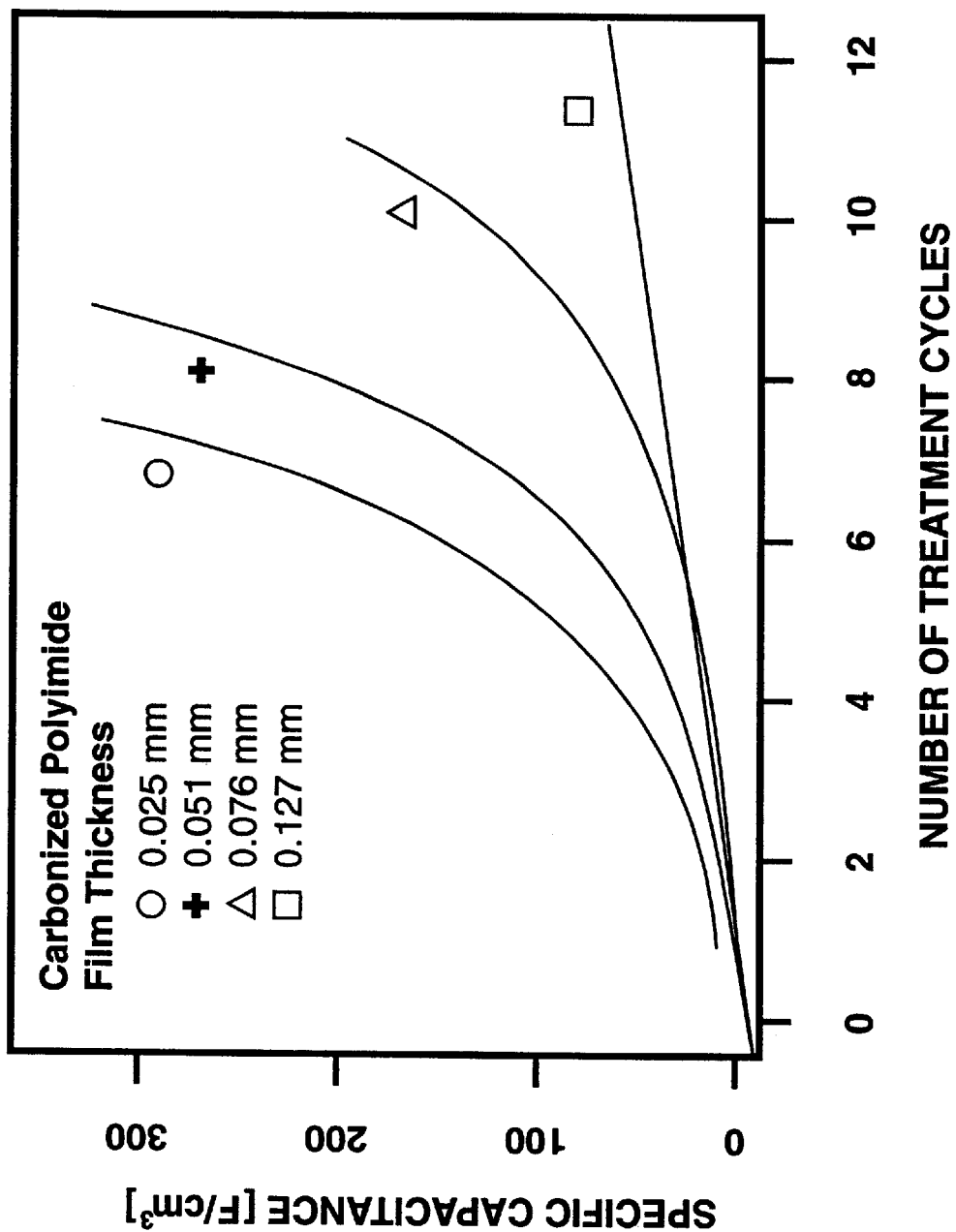
FIG. 2 shows results that can be achieved by the process of the invention.

The oxidation and pyrolysis operations are repeated alternately about 7 times, or until the desired capacitance is achieved. FIG. 2 shows the volume-specific capacitance that can be achieved with polyimide-derived carbon of different thicknesses. It also shows that repeated oxidation and pyrolysis treatments lead to successively higher capacitance values, up to a point beyond which no further gain is possible. All carbon samples experienced a significant loss of structural strength after 7 to 10 treatment cycles. Also, as can be seen from the graph, thin carbon samples yield higher specific capacitance levels than thicker samples. Although the present process is not concerned with graphitization, the thickness effect is similar to the thickness dependence of the polyimide carbon ability to graphitize, as observed by Hishiyama et al. [Carbon 30, 333 (1993)]. These authors showed that thin polyimide films have a high degree of in-plane orientation of molecular chains, which promotes graphitization. It has now been established that the same polymeric alignment is beneficial for the development of the electrochemical surface accessibility by means of the present inventive carbon activation process.

Figure 3:
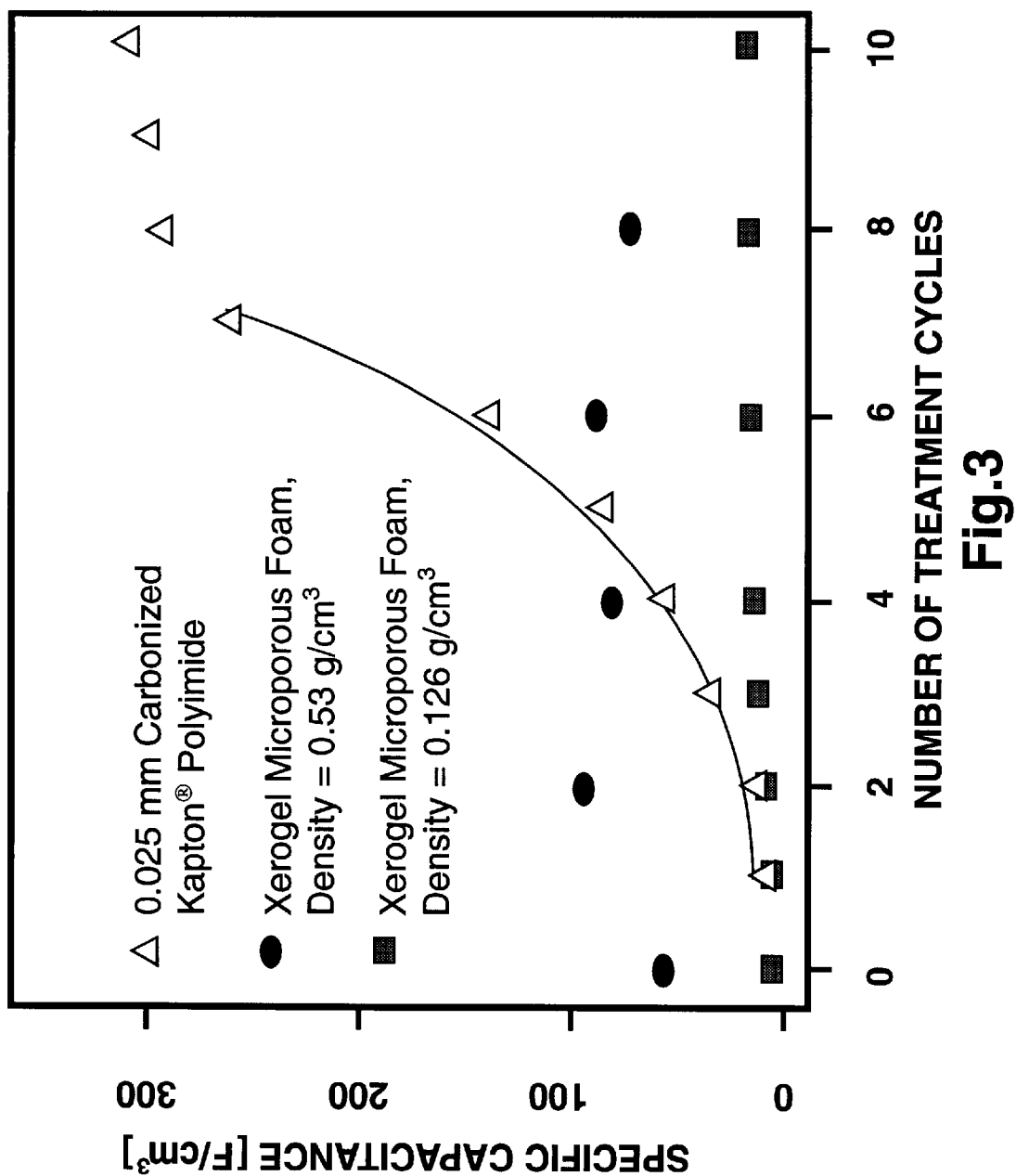
FIG. 3 compares the results obtained with the present invention with those of competing methods.

It is important, therefore, to consider this alignment property when selecting carbon precursors for double layer capacitors. In this respect, the preferred method for measuring the in-plane orientation of polymer films is to determine their birefringence. FIG. 3 shows the limitations of the process of the invention when used for treating unsuitable carbons. These materials, which are used for comparison with the Kapton® carbon films are xerogel carbon foams. These foams, which can be used in supercapacitors, were prepared as taught in U.S. Pat. No. 5,260,855. The Kapton® polyimide film used to prepare the carbon sample was 0.025 millimeter thick. The data shown in FIG. 3 clearly indicate the superiority of carbon films obtained from high birefringence Kapton® polyimide films.

The following examples will illustrate the method used to prepare carbon for use as capacitor electrodes.

EXAMPLE 1

Twenty disks, 2 cm in diameter, were cut from 0.0051 cm thick Kapton® HN polyimide film with a punch press. The disks were carbonized between flat, 0.07 cm thick stainless steel plates, stacked five plates high, by heating in argon gas to 850° C. and holding at this temperature for one hour. The resulting carbon films had the same glossy surface as the polyimide disks, but their diameter had uniformly shrunk to 1.5 cm.

Next, the carbon disks were dropped in a 400 ml glass beaker containing about 100 ml 5M nitric acid. Gentle agitation assured that the specimens remained covered by the acid for 5 minutes. The acid was decanted, water was added, and the disks were manipulated to form a stack. The stacks of carbon disks was removed from the water and placed on blotting paper to absorb most of the water. The disks adhered to each other because of water trapped between them. They were separated by heating at 90° C. to evaporate the water. The disks were then arranged in a crucible for a 20 minute heat treatment in argon gas at 350° C. in a tube furnace. The nitric acid immersion and the 350° C. heat treatment were repeated 8 times to complete the activation process.

To measure the capacitance, selected carbon disks were attached to paper clip-shaped platinum wires, immersed in 10% sulfuric acid, and connected to a test circuit. Charging and discharging individual specimens with the help of a platinum counter electrode yielded an average capacitance of 2.6 F, or 290 F/cm$^3$ when referred to the disk volume. Using 2 carbon disks for the charge/discharge test resulted in 1.3 F.

EXAMPLE 2

Capacitor electrodes having an area of only 1.8 cm$^2$ are too small for electrical vehicle applications. Therefore, in order to determine the feasibility of much larger electrodes, an 11×25×0.0076 cm piece of Kapton® HN polyimide was carbonized between 0.3 cm graphite plates at 850° C. The resulting carbon sheet was 8.3×20×0.0076 cm in size and had no cracks or other defects. This experiment demonstrated that carbon films of this size can be made, although they must be handled with great care during the activation process. With suitably constructed treatment racks, still larger carbon sheets are highly feasible.

As mentioned earlier, double layer capacitors made with the carbon of this invention may greatly contribute to the successful development of battery-powered electric or hybrid electric vehicles. But, in any event, they can serve well in the memory conservation of electronic devices during power outages.

Finally, while the present invention has been described in terms of the particularly preferred embodiments, it is not limited to these specific examples. Other embodiments and modifications can be made by those skilled in the art without departing from the spirit and the scope of the invention.

What is claimed is:

1. A process for the preparation of carbon suitable for use as electrodes in double layer capacitors, consisting of
   a) immersing a carbonized film of a carbon-containing polymeric material thinner than about 0.125 millimeter in a liquid oxidizing agent for a period of about 5 to about 15 minutes,
   b) heating the oxidized film at a non-graphitizing temperature of at least 350° C. in a non-oxidizing atmosphere for about 30 minutes, and
   c) repeating steps (a) and (b) alternately until the resulting carbon has reached a capacitance of about 300 farads per cubic centimeter.

2. The process of claim 1 wherein the carbon-containing polymer film is a polyimide film.

3. The process of claim 2, wherein the immersion is carried out in 1 to 5 molar nitric acid for a period of about 5 minutes.

4. The process of claim 2, wherein the heating step is carried out at about 350° C. in an inert atmosphere.

5. The process of claim 2, wherein the immersion step and the heating step are carried out alternately for a given number of times ranging from seven to ten.

6. A double layer capacitor in which the carbon electrodes are made by the process of claim 5.

7. A double layer capacitor having electrodes made of compressed carbon powder obtained by pulverizing a carbon film prepared by the process of claim 1.

8. A process for the preparation of carbon suitable for use as electrodes in a double layer capacitor, consisting of
   a) treating a thin carbonized film of polyimide having an original thickness of less than 0.125 millimeter, with aqueous nitric acid at a concentration of about 5 M for a period ranging from about 5 to about 15 minutes,
   b) heating the treated film at a temperature of about 350° C. for about 20 minutes, and
   c) repeating steps (a) and (b) alternately seven to ten times.

* * * * *